United States Patent
Betteridge et al.

(10) Patent No.: US 12,321,830 B2
(45) Date of Patent: Jun. 3, 2025

(54) MACHINE LEARNING FOR INTENT MATCHING ENGINE

(71) Applicant: Zoom Communications, Inc., San Jose, CA (US)

(72) Inventors: Jared Lamont Betteridge, Herriman, UT (US); Justin Bryce Betteridge, Boise, ID (US); Connor Isaac Brinton, Holly Springs, NC (US); Victor The Vong, Dublin, CA (US); Samuel John Wenke, Cincinnati, OH (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/969,816

(22) Filed: Oct. 20, 2022

(65) Prior Publication Data

US 2024/0135232 A1 Apr. 25, 2024
US 2024/0232680 A9 Jul. 11, 2024

(51) Int. Cl.
*G06N 20/00* (2019.01)
*G06F 16/334* (2025.01)

(52) U.S. Cl.
CPC ......... *G06N 20/00* (2019.01); *G06F 16/3344* (2019.01)

(58) Field of Classification Search
CPC .............................. G06N 20/00; G06F 16/3344
See application file for complete search history.

(56) References Cited

U.S. PATENT DOCUMENTS

| | | |
|---|---|---|
| 7,260,570 B2 | 8/2007 | Brown et al. |
| 10,719,524 B1 | 7/2020 | Nguyen et al. |
| 11,158,308 B1 * | 10/2021 | Bissell ................... G10L 15/22 |
| 2015/0296026 A1 * | 10/2015 | Smyth .................... H04W 4/21 |
| | | 709/228 |
| 2019/0012390 A1 | 1/2019 | Nishant et al. |
| 2020/0184540 A1 * | 6/2020 | D'Souza ........... G06Q 30/0635 |
| 2020/0364307 A1 | 11/2020 | Min et al. |
| 2022/0058191 A1 * | 2/2022 | Chen ................. G06F 16/24564 |
| 2022/0058342 A1 * | 2/2022 | Fan ......................... G06N 5/04 |
| 2022/0398524 A1 * | 12/2022 | Abdullah ............. G06F 40/226 |

OTHER PUBLICATIONS

Nuruzzaman, Mohammad, and Omar Khadeer Hussain. "A survey on chatbot implementation in customer service industry through deep neural networks." 2018 IEEE 15th International Conference on e-Business Engineering (ICEBE). IEEE, 2018. (Year: 2018).*

(Continued)

*Primary Examiner* — Kevin W Figueroa
(74) *Attorney, Agent, or Firm* — Young Basile Hanlon & MacFarlane, P.C.

(57) ABSTRACT

A server obtains a natural language query from a first user device. The server matches an intent to the natural language query using an intent matching engine. The intent represents predicted data associated with the natural language query. The server transmits the natural language query and the intent to a second user device. The server receives, from the second user device, a response indicating whether the natural language query is properly matched to the intent. The server trains the intent matching engine based on a machine learning technique and the response.

18 Claims, 9 Drawing Sheets

(56) References Cited

OTHER PUBLICATIONS

Arapakis, Ioannis, and Luis A. Leiva. "Learning efficient representations of mouse movements to predict user attention." Proceedings of the 43rd International ACM SIGIR Conference on Research and Development in Information Retrieval. 2020. (Year: 2020).*

Intent Matching, Dialogflow ES, Google Cloud, Aug. 4, 2022, 3 pages.

Let your customers find what they are looking for, Simple way to extract search query intent, Bigquery, Solr, A. Bashar Eter, May 17, 2020, 5 pages.

International Search Report and Written Opinion mailed on Dec. 18, 2023 in corresponding PCT Application No. PCT/US2023/033973.

* cited by examiner

MACHINE LEARNING FOR INTENT MATCHING ENGINE

FIELD

This disclosure relates to machine learning techniques for an intent matching engine, which may, for example, match a natural language query to an intent.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
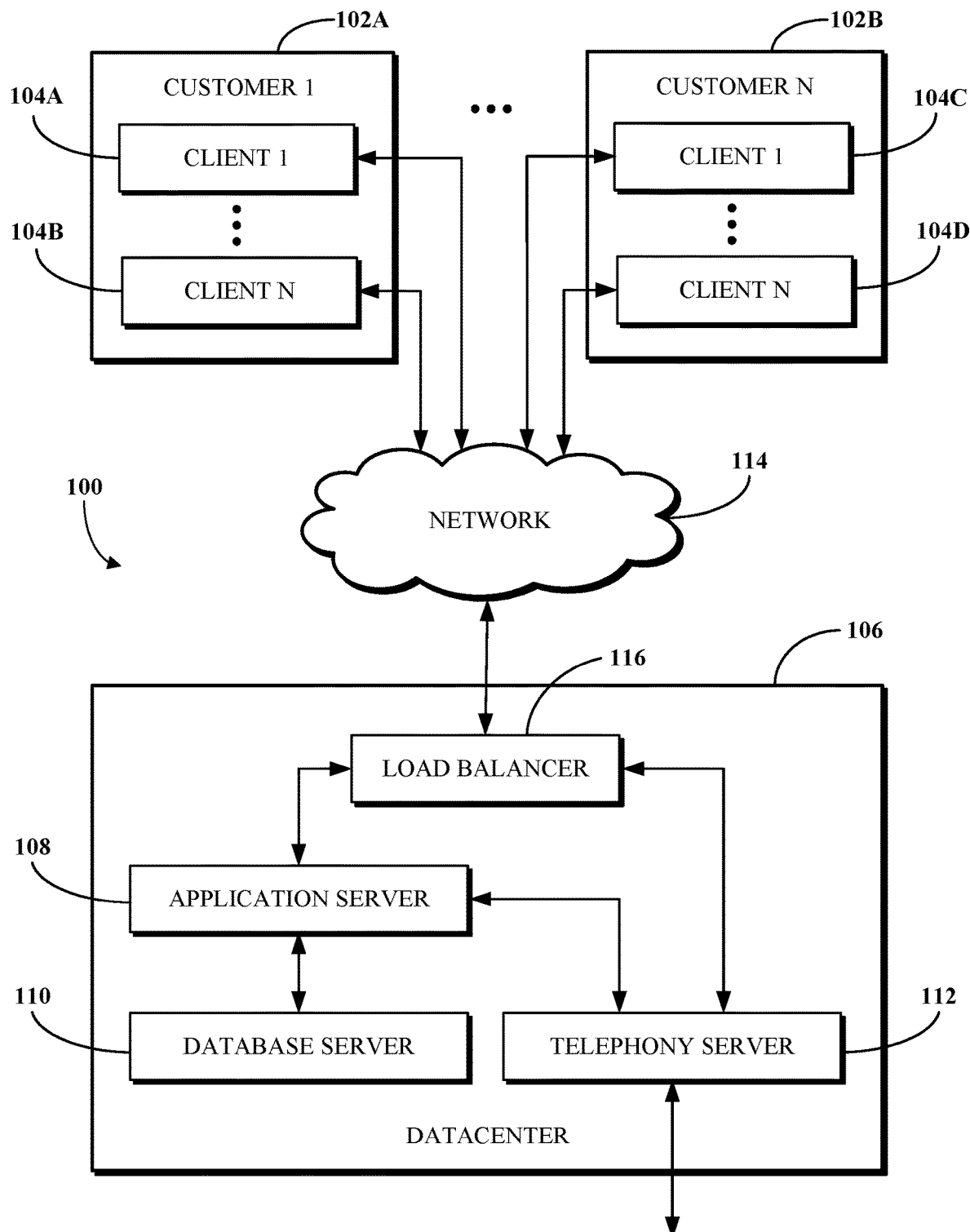
FIG. 1 is a block diagram of an example of an electronic computing and communications system.

A contact center may be operated by or otherwise on behalf of a business to assist users of various products and related services of the business. The contact center may be accessible to such users via multiple modalities, for example, telephone or Internet-based text, audio, or video communication implemented via a Unified Communication as a Service (UCaaS) system. In recent years, many contact centers have begun to use automated chat bots (e.g., computer-implemented engines that automatically process spoken or written natural language input provided by a user) that process queries in the form of audio or text-based input from a user in order to identify the user's goals and to provide an appropriate response. However, mapping a natural language audio or text-based input to an appropriate goal may be challenging. Techniques for automatically identifying the user's goals based on a natural language audio or text-based input may be desirable.

One solution to this problem is to search a data repository based on the natural language text (typed by the user or derived from an audio input) provided by the user. The data repository may be searched to respond to a query of the user and/or to meet a goal of the user (as indicated by the query). However, this solution might not be effective as the natural language text might map to irrelevant contact (e.g., a query for "mobile phone" might lead to a result related to a mobile phone accessory) and/or might leave out relevant or otherwise related content (e.g., a query for "mobile phone" might not lead to a relevant result that describes a "cellular device"). Furthermore, if the query is in a first natural language (e.g., Spanish) and the data repository includes content in a second natural language (e.g., English), the natural language text-based search might not result in any results being generated.

Implementations of this disclosure address problems such as these by having a server access a natural language query from a querying user device. For example, a querying user might type, "Help me change my home address," into a chat application to communicate with for a credit card company. The chat application may be accessible via a mobile application or website of the credit card company, and the communications may be processed by a chat bot. The server matches an intent to the natural language query using an intent matching engine. The intent may be "change billing address." An intent may represent a goal of a user entering the natural language query, which could be handled by a specific workflow. Many different natural language queries may match to the same intent. For example, the spoken or written natural language queries, "Help me change my home address," and "Update billing address," may both map to the intent "change billing address." The server maps a workflow to the intent. The workflow may be associated with a webpage, a set of human agents, or an automated workflow performed by the chat bot. The server transmits an output associated with the workflow to the querying user device. The output may include, for example, a webpage with instructions for how to change the billing address in the credit card company's online banking application. Alternatively, the output may include the chat bot asking the querying user to provide their new billing address and automatically updating the records of the credit card company. In another alternative, the output includes the user being transferred to a human agent who is able to assist with changing the billing address.

As used herein, the term "intent" may include a member of a set of stored intents, where multiple natural language queries may map to the same intent. The intent may correspond to predicted data, for example, a predicted goal, of a user entering the natural language query. The predicted data may be associated with the natural language query. For example, a credit card company may have intents including: "change billing address," "dispute a charge," "request credit limit increase," and "request interest rate reduction," each of which could have multiple different corresponding natural language queries.

The natural language query and the matched intent may be transmitted to a reviewing user device for review thereat. For example, the reviewing user device may be operated by a quality assurance employee of the credit card company. The user of the reviewing user device generates a reviewing response indicating whether the matching of the intent to the natural language query is accurate. The intent matching engine is trained using online learning based on the reviewing response. As a result of the online learning, the intent matching engine's performance may improve over time, and the intent matching engine might be able to adjust its performance responsive to changes in usage of the natural language over time.

According to some implementations, the server monitors activity of the querying user device with respect to the transmitted workflow. The intent matching engine is further trained based on the activity of the querying user device with respect to the transmitted workflow. For example, if the transmitted workflow is an article describing how to update the billing address, the server may monitor whether the user opened or scrolled through the article, and whether the user later logged into online banking to perform the steps indicated in the article.

In some cases, as multiple intents are identified from many queries of many users, a dashboard of intents over time may be generated. The dashboard may be transmitted to the reviewing user device or to an administrator device. The dashboard may indicate (e.g., in a graph or a table) a number of queries associated with each intent during multiple time periods. As a result, the reviewing user or the administrator may be able to detect which intents are becoming more or less common with time. This may be a leading indicator of a trend. For example, if the number of users who have the intent "request interest rate reduction" is increasing, the credit card company may consider offering a lower interest rate product.

To describe some implementations in greater detail, reference is first made to examples of hardware and software structures used to implement online learning for an intent matching engine. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
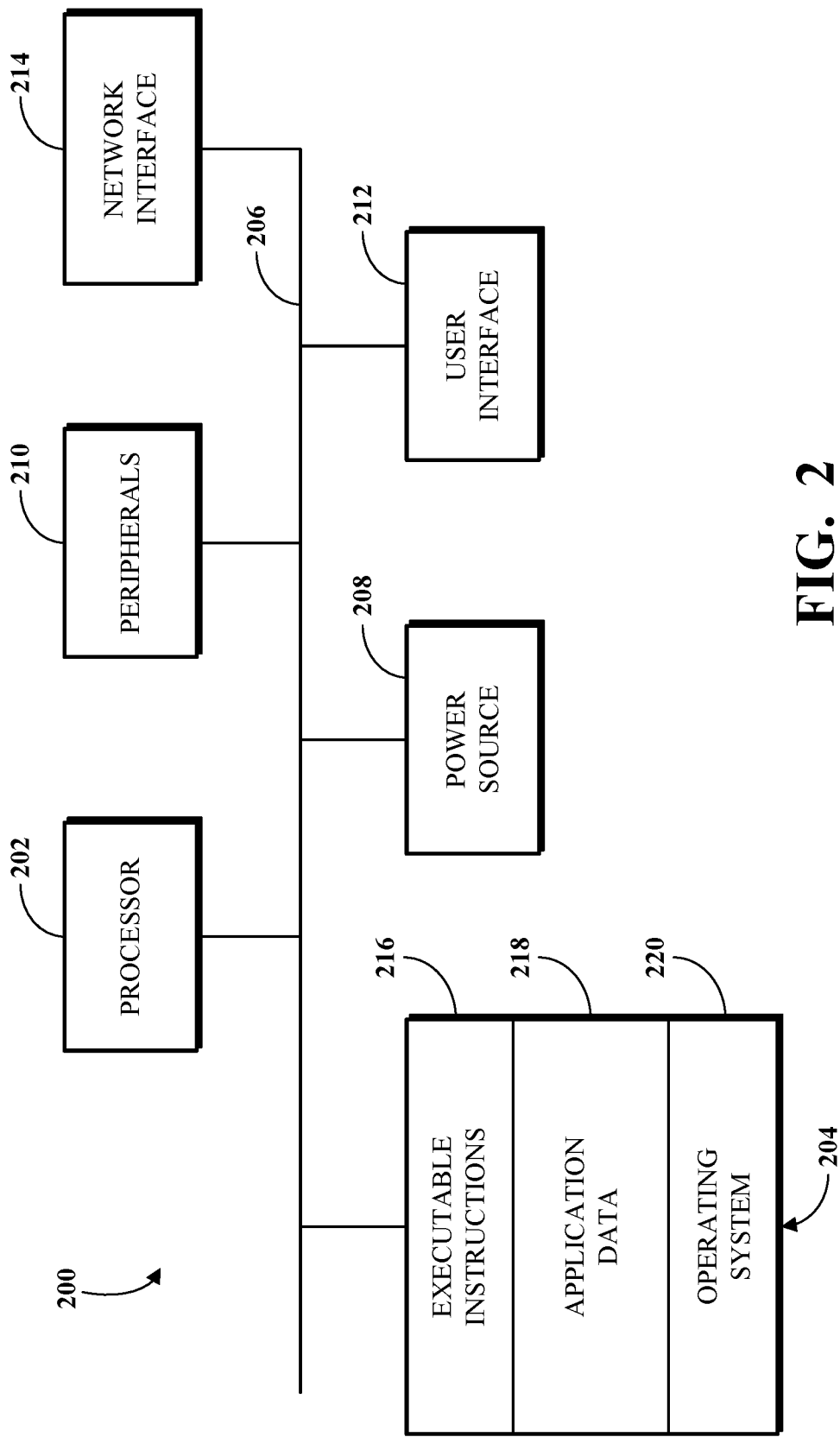
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
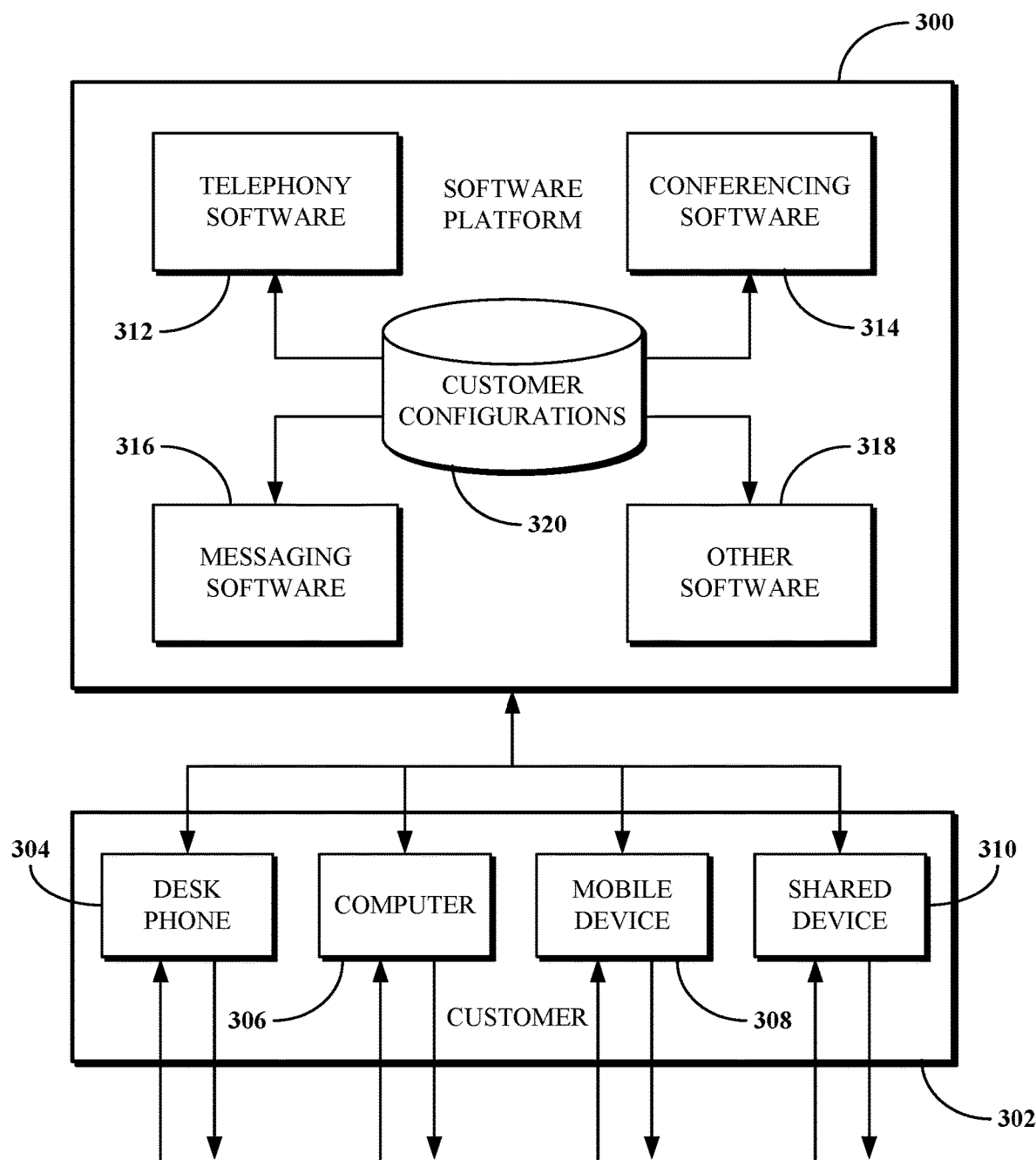
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software of the intent management engine and software for online learning by the intent management engine.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
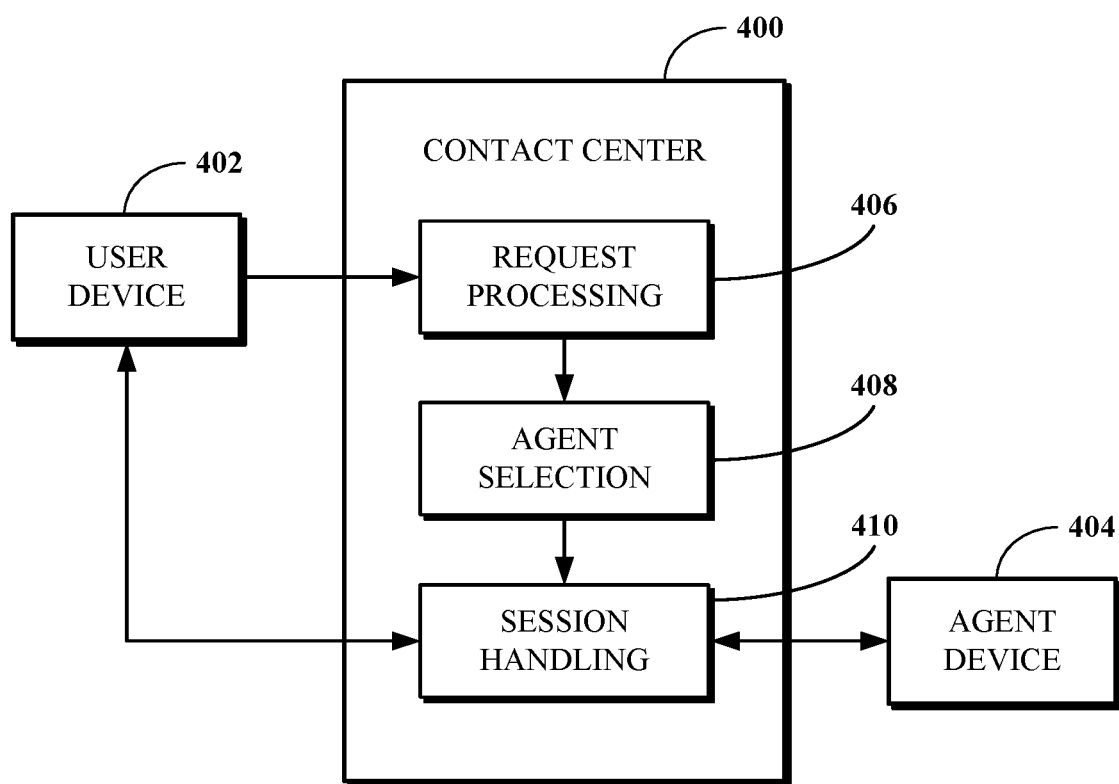
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
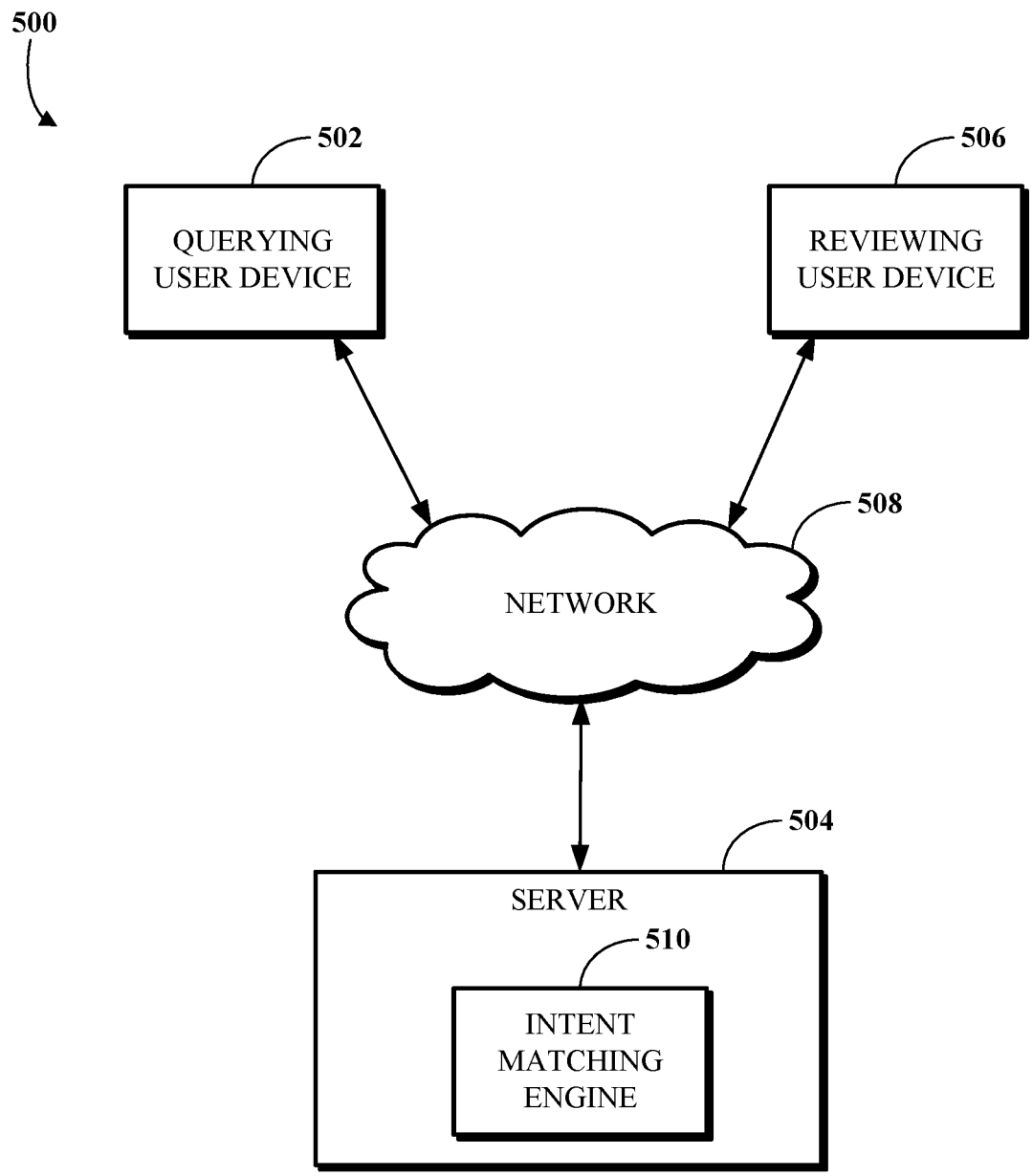
FIG. 5 is a block diagram of an example of a system in which intent matching may be performed.

FIG. 5 is a block diagram of an example of a system 500 in which intent matching may be performed. As shown, the system 500 includes a querying user device 502, a server 504, and a reviewing user device 506 capable of communicating over a network 508. The server 504 stores an intent matching engine 510 that matches an input natural language query to an intent. The intent matching engine 510 may be implemented using machine learning or other artificial intelligence technologies. In some examples, the intent matching engine 510 leverages a convolutional neural network (CNN) that is capable of online learning. Alternatively, any other type of artificial neural network (ANN) may be used. In some cases, the intent matching engine may be implemented using at least one of a classification model, a regression model, clustering, dimensionality reduction, or deep learning. More details of the operation of the intent matching engine are provided below. As used herein, an engine may include software, hardware, or a combination of software and hardware.

The querying user device 502 may correspond to the user device 402 and/or to one of the clients 104A-D. The server 504 may correspond to a server of the contact center 400 and/or to the application server 108. The reviewing user device 506 may correspond to the agent device 404 and/or to one of the clients 104A-D.

According to some implementations, the querying user device 502 transmits a natural language query to the server 504 over the network 508. The natural language query may be spoken, typed, or otherwise inputted into the querying user device 502 text or recording in a natural language (e.g., English, Spanish, or Chinese). The natural language query may include a question or a request provided to a chat bot, for example, "I would like to cancel my subscription."

In response to receipt of the query, the server 504 uses the intent matching engine 510 to match the query to an intent, and transmits, to the querying user device 502, an output associated with the intent. An intent may represent a goal or a purpose that a user of the querying user device is attempting to accomplish. For example, the query, "I would like to cancel my subscription," may match to the intent, "cancel subscription." The server 504 transmits (e.g., after the output has been transmitted to the querying user device 502), to the reviewing user device 506, an indication of the query received from the querying user device 502 and the intent matched to the query. The server 504 receives, from the reviewing user device 506, an response indicating whether the query was properly matched to the intent. The server 504 further trains the intent matching engine 510, using online learning, based on the response received from the reviewing user device 506. The training may improve future operation of the intent matching engine 510, but might not adjust the output that was provided to the querying user device 502 in response to the natural language query. Examples of operation of the querying user device 502, the server 504, and the receiving user device 506 are described in greater detail in conjunction with FIG. 6.

Figure 6:
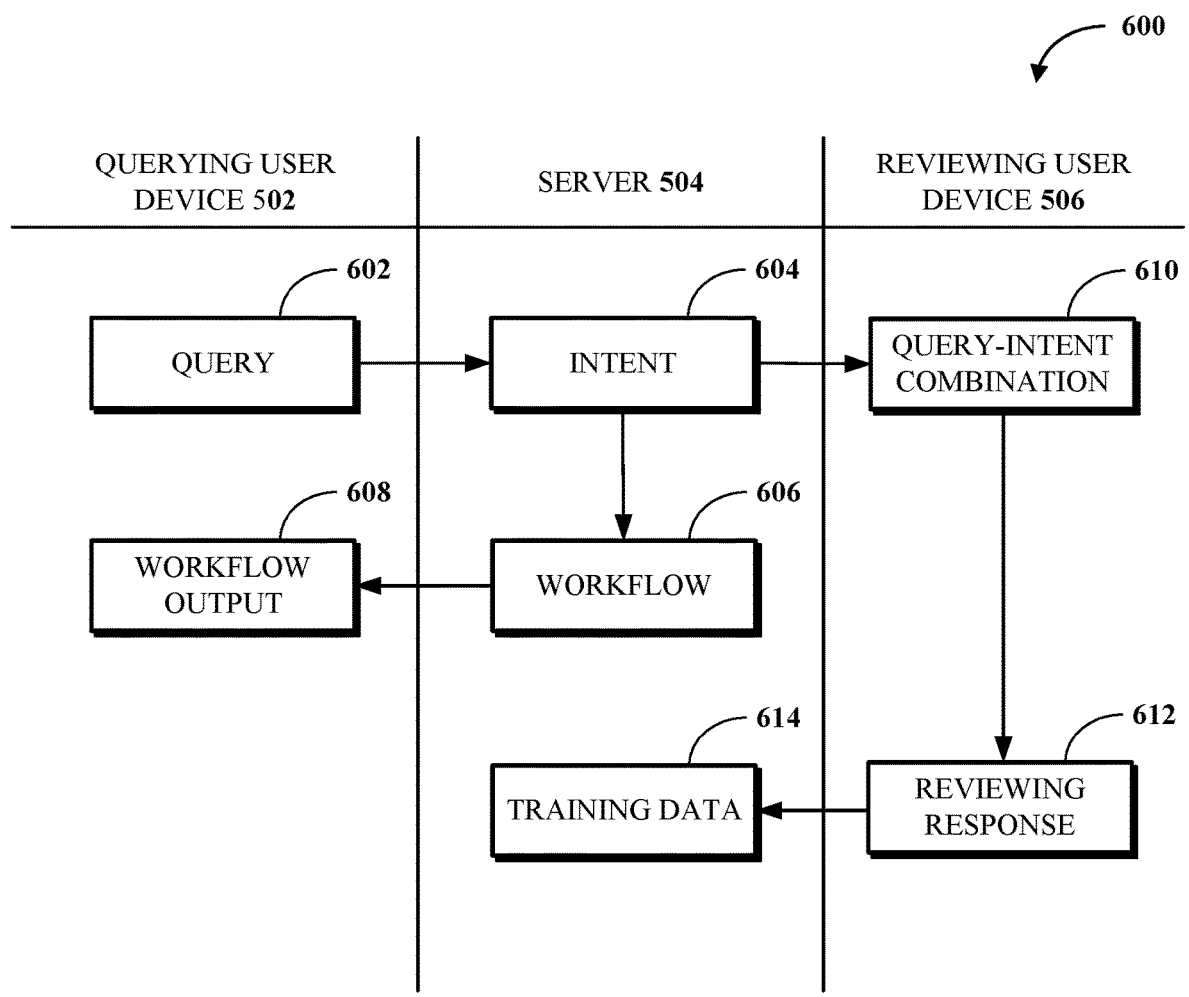
FIG. 6 is a data flow diagram of an example of online learning for an intent matching engine.

FIG. 6 is a data flow diagram of an example of online learning 600 for an intent matching engine. As shown, the online learning 600 is implemented using the querying user device 502, the server 504, and the reviewing user device 506 described in conjunction with FIG. 5.

As shown in FIG. 6, the querying user device 502 generates a query 602 in a natural language and transmits the query 602 to the server 504. The query 602 may be generated during a communication with a chat bot of the server 504 via a telephone call, a messaging application, a website, or a dedicated application of an entity associated with the chat bot. For example, a user might wish to open a savings account at a bank. To accomplish this, the user might telephone the bank and may be asked, by a chat bot, "Please state the reason for your call." In response, the user might say, "I want to open a new savings account," and that phrase may become the query.

The server 504 matches the query 602 to an intent 604 using the intent matching engine 510 shown in FIG. 5. The intent 604 may be identified by applying a CNN or other artificial intelligence software of the intent matching engine 510 to the query 602. For example, the query 602 "I want to open a new savings account," may match to the intent "open account." The server 504 identifies a workflow 606 corresponding to the intent 604. The workflow 606 may include, for example, a link to a webpage for opening new accounts with the bank or connection with a human representative who can assist the user of the querying user device 502 with opening the new account. In some cases, the workflow 606 may be performed by the chat bot of the server 504 directly. For example, to open the new account, the workflow 606 may include the chat bot verifying the user's identity (e.g., by having the user provide their social security number and answer security questions generated based on their credit report), verifying the type of account (e.g., savings account) that the user wishes to open, requesting the account number of another account from which the opening deposit is to be obtained, and initiating an automated clearing house (ACH) request for the opening deposit. The server transmits a workflow output 608 associated with the workflow (e.g., questions by the chat bot, the link to the webpage, or the connection with the human representative) to the querying user device 502.

Figure 8:
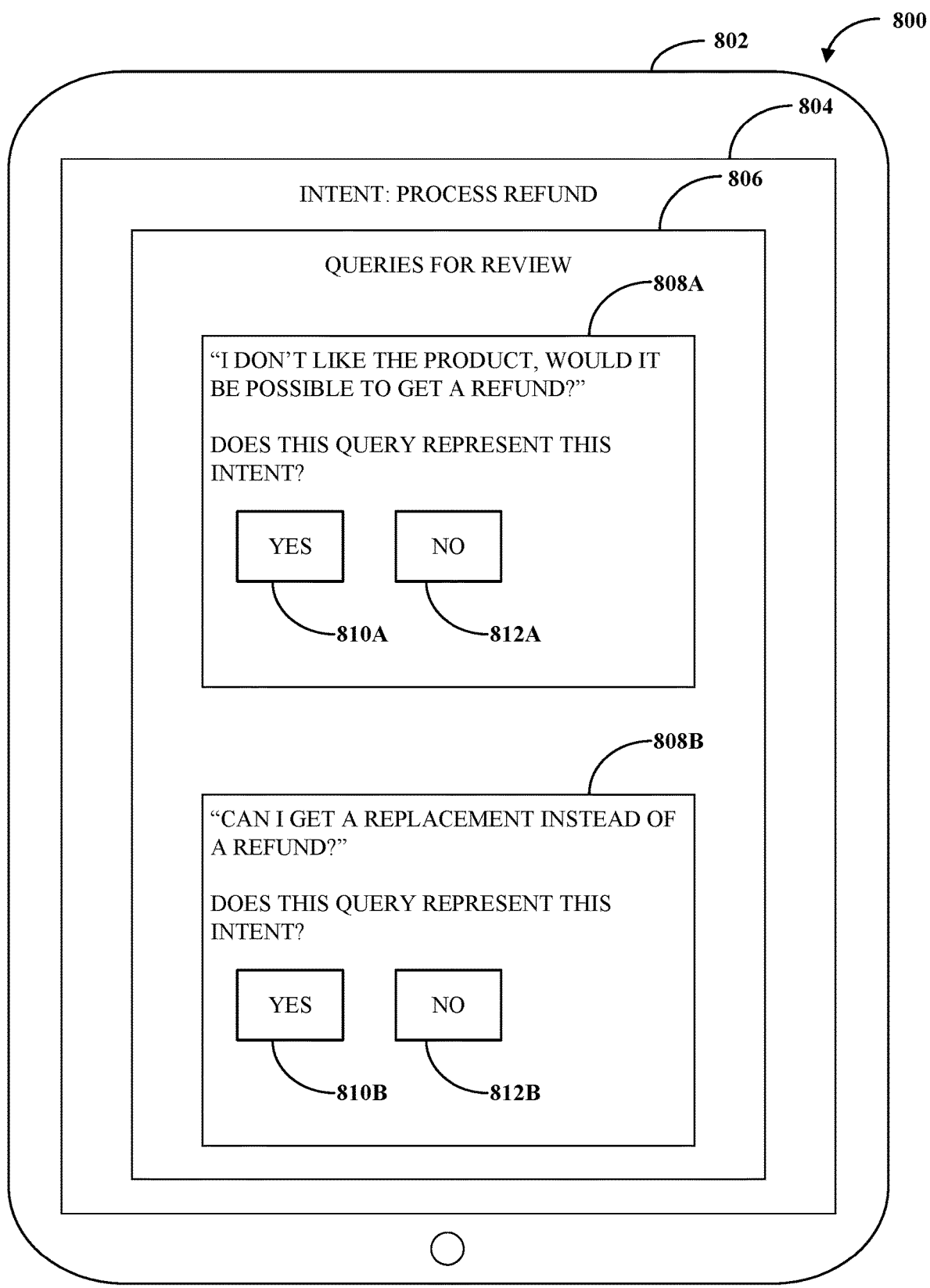
FIG. 8 is a user interface diagram of an example of a query reviewing interface.

The server 504 transmits a query-intent combination 610, including the query 602 and the intent 604, to a reviewing user device 506. The reviewing user device 506 may be operated by an agent associated with the server 504, for example, an employee of a business (e.g., the bank) associated with the server. While the query-intent combination 610 is illustrated, it should be noted that the query 602 and the intent 604 may be transmitted to the reviewing user device 506 separately and may be stored separately at the reviewing user device 506. The reviewing user device 506 may generate a visual output (e.g., as shown in FIG. 8) representing the query-intent combination 610 and prompt the user of the reviewing user device 506 to input a reviewing response 612 indicating whether the query was accurately matched to the intent. For example, the query 602 "The balance on my checking account is high; I want to open a new savings account," is accurately matched to the intent 604 "open account." However, had this query 602 been matched to the intent "check account balance," the user might indicate that the query was not accurately matched to the intent.

The reviewing user device 506 transmits the reviewing response 612 to the server 504. At the server 504, the reviewing response 612 is incorporated into training data 614, which is used to further train the intent matching engine 510 to improve its performance in the future. The server 504 may use online learning techniques to recursively train the intent matching engine 510 based on the training data 612 which is generated from the operation of the intent matching engine 510. As a result, if the intent matching engine 510 has little training data when it is initialized at the server 504, the intent matching engine 510 may initially perform relatively poorly. However, the performance of the intent matching engine 510 may improve over time as more training data becomes available.

Figure 7:
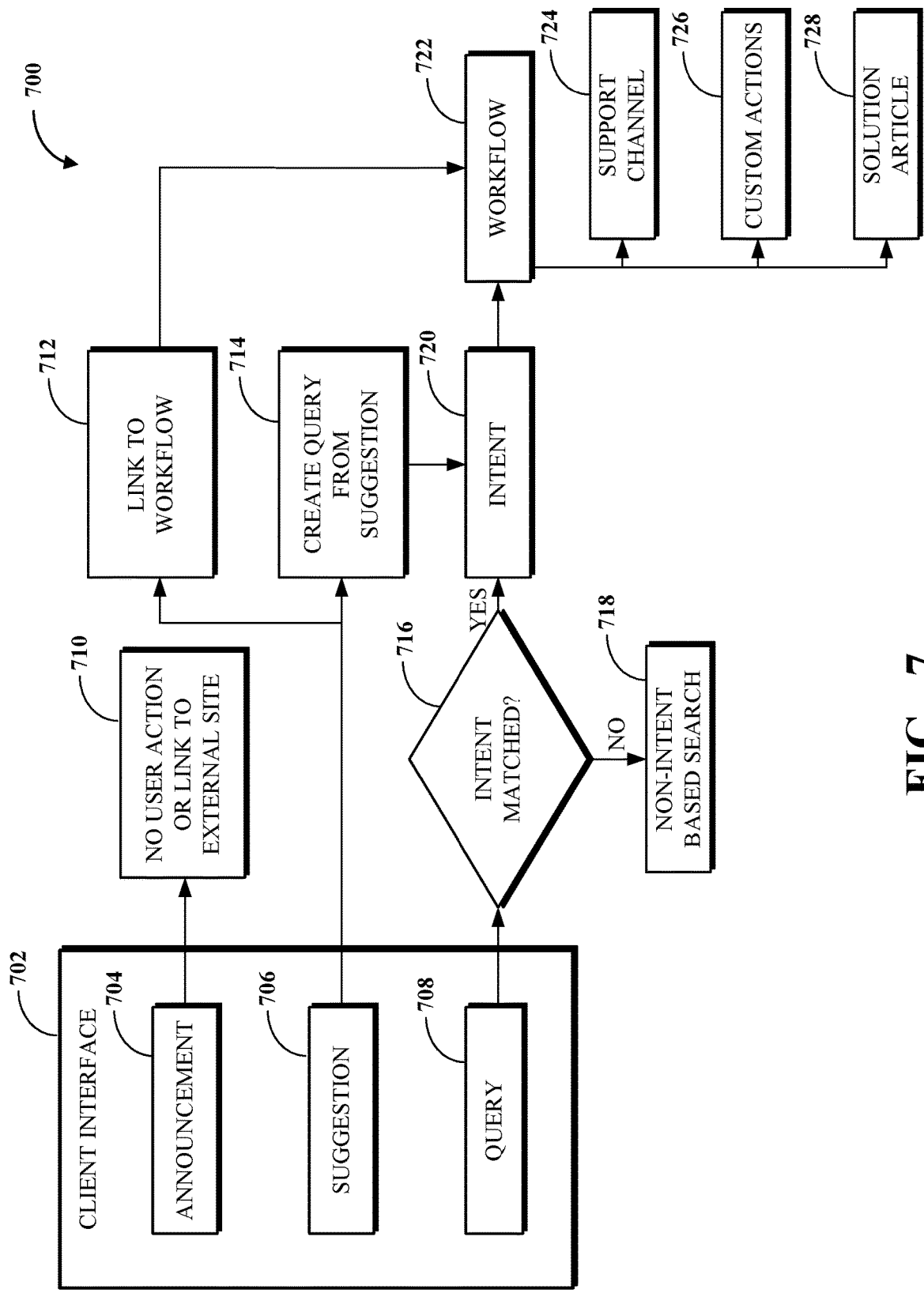
FIG. 7 is a flow diagram of an example of processing client interface data.

FIG. 7 is a flow diagram of an example of processing client interface data 700. As shown, a client interface 702, which includes data that may be transmitted to the clients 104A-D or the querying user device 502 includes an announcement 704, a suggestion 706, and a query 708. For example, in the context of an online store, an announcement may be transmitted (e.g., to subscribers who subscribe to receive email or messages (e.g., via short message service (SMS) or multimedia messaging service (MMS) through a cellular provider or via an online messaging service)). The announcement may include, for example, information about discounts or products available at the online store. The client interface may include a suggestion 706. The suggestion may represent a recommendation by an employee of the online store or via an artificial intelligence engine operated by the online store. For example, a user who recently purchased a printer from the online store may receive a recommendation to purchase ink or paper for the printer. Announcements 704 and suggestions 706 may be transmitted to users who requested to receive such notifications, and users may be able to opt out or unsubscribe from future announcements 704 or suggestions 706. The client interface 702 may also include an interface for a user-generated query 708. The query 708 may include a spoken or written natural language request that is automatically processed by a server. The query 708 may correspond to the query 602.

As shown, the announcement 704 may include no user action or link to external site 710. The suggestion 706 may link to a workflow 712 (e.g., the suggestion 706 to purchase an item from an online store may link directly to a workflow (e.g., a webpage or chat bot interface) for purchasing the item from the online store). Alternatively, the suggestion 706 may link to the creation of a query from the suggestion 714. For example, a suggestion to purchase handyperson services to assist with assembling furniture that the user recently purchased from the online store for delivery to San Francisco may lead to the generation of a natural language query for finding a handyperson who is skilled in furniture assembly and located in San Francisco, with some parts of the query (e.g., a geographic location or a maximum travel distance) being input by the user.

Upon receiving the query 706 via the client interface 702, the server 504 determines whether an intent is matched 716 to the query. If not, a non-intent based search 718 of the query 708 is conducted. For example, in the online store context, if the query includes the word "coffee," and no intent is matched to "coffee," the online store may be searched for products (or other pages) matching "coffee." If an intent is matched, the intent 720 is (at least temporarily) stored, and a workflow 722 corresponding to the intent 720 is identified. (It should be noted that the workflow may also be identified based on the suggestion 706 in the link to workflow 712.) The intent 720 may correspond to the intent 604 of FIG. 6. The workflow 722 may correspond to the workflow 606 of FIG. 6.

The workflow 722 may include at least one of a support channel 724, custom actions 726, or a solution article. For example, in the online store context, the workflow 722 for the intent 720 "apply coupon," may include the support channel 724 associated with a human agent who is capable of applying coupons to orders. Alternatively, the workflow 722 for the intent "apply coupon" may include custom actions 726, implemented by a chat bot, to apply the coupon (e.g., asking the user to input the product they wish to purchase and the coupon number, and verifying whether the coupon was successfully applied). In another example, the workflow 722 for the intent "apply coupon" may include the solution article 728 which explains how to apply coupons via the mobile application or website of the online store.

FIG. 8 is a user interface diagram of an example of a query reviewing interface 800. As shown, the query reviewing interface 800 is presented at a tablet computer 802. In alternative implementations, the query reviewing interface 800 may be presented at a laptop computer, a desktop computer, a mobile phone or any other computing device. The tablet computer 802 displays a page 804 associated with the intent "process refund." The page 804 includes queries for review 806, which were received, at the server 504, from querying user devices 502, and matched, by the intent matching engine 510, to the intent "process refund." The queries for review 806 include queries 808A, 808B. Each query 808A, 808B is associated with a button 810A, 810B for indicating that the query 808A, 808B represents the intent "process refund" of the page 804, and a button 812A, 812B for indicating that the query does not represent the intent "process refund" of the page 804. As illustrated, the query 808A, "I don't like the product, would it be possible to get a refund?" is properly matched to the intent "process refund," so the user of the tablet computer 802 may select the "yes" button 810A. The query 808B, "Can I get a replacement instead of a refund?" is not properly matched to the intent "process refund." Thus, the user of the tablet computer may select the "no" button 812B.

While two queries are illustrated, the disclosed technique may be implemented with any number of queries, not necessarily two. As shown, both queries 808A, 808B are displayed in text. In alternative implementations, one or both of the queries 808A, 808B may be audio or video recordings. As show, both queries 808A, 808B are in English (and the intents and workflows are also in English). In alternative implementations, one or both of the queries may be in a different language (e.g., Spanish). For example, the text of the query 808A may be, "No me gusta el producto, ¿sería posible obtener un reembolso?" which can be translated to "I don't like the product, would it be possible to get a refund?" in Spanish, and the intent matching engine 510 may still properly match the query 808A to the English language intent "process refund." In some implementations, the server 504 translates the query from Spanish into English prior to matching the intent to the query. In some implementations, the intent matching engine 510 is trained to process Spanish language queries, and does not translate the Spanish language query prior to matching it to the English language intent.

The workflow may associated with the intent may be available in English only, and the English language workflow may be provided in response to the Spanish language query. Alternatively, there may be multiple workflows in different languages, and a Spanish language workflow may be provided in response to the Spanish language query. In some cases, a Spanish language workflow might not be available, but workflows might be available in English and French. The user of the querying user device 502 may be prompted to indicate whether they prefer to proceed with an English or French workflow. The prompt may be presented in multiple different languages simultaneously, in Spanish, or in a default language (e.g., English) associated with the server 504.

Figure 9:
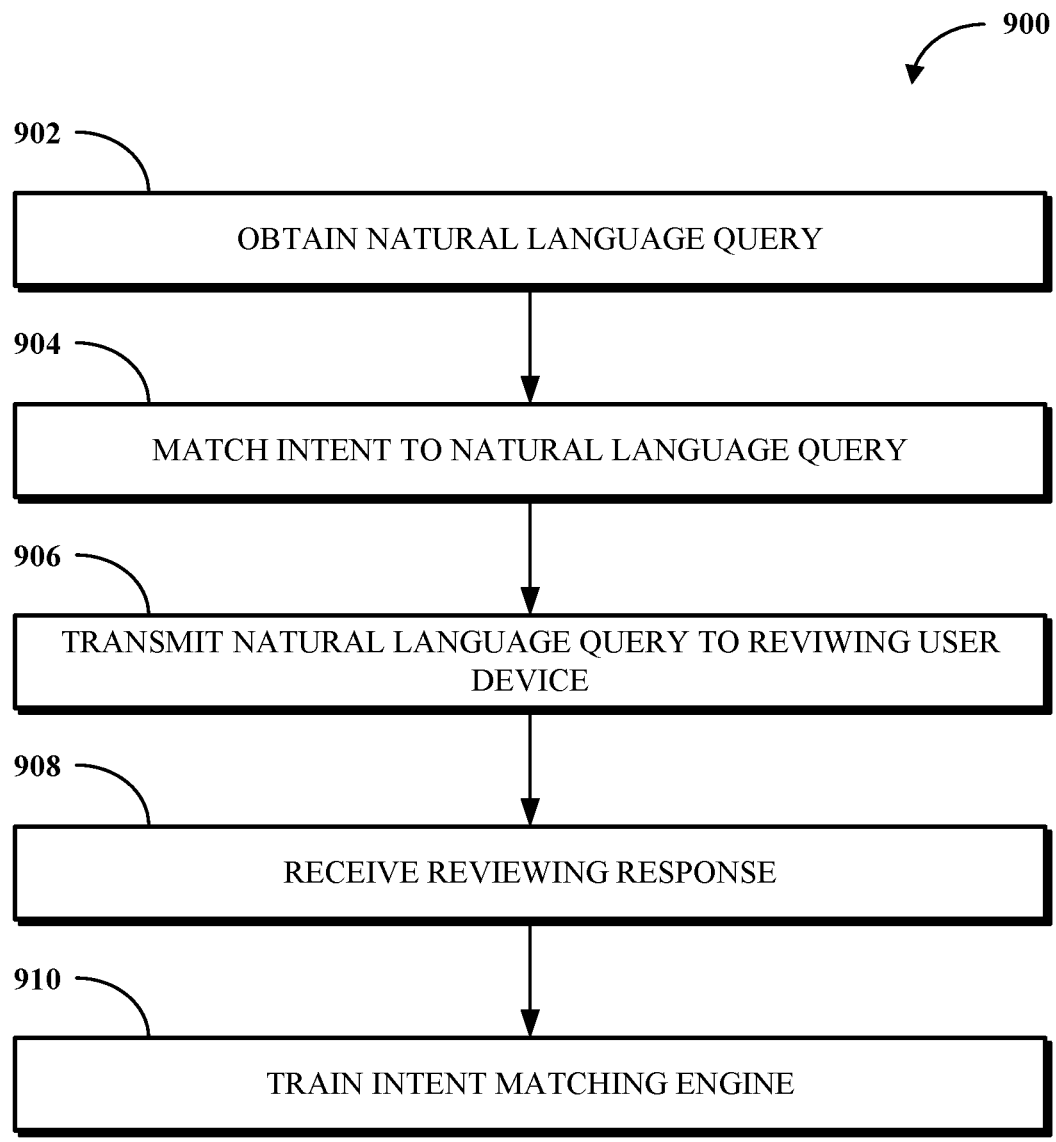
FIG. 9 is a flowchart of an example of a technique for online learning for an intent matching engine.

To further describe some implementations in greater detail, reference is next made to examples of techniques which may be performed by or using an intent matching engine. FIG. 9 is a flowchart of an example of a technique 900 for online learning for an intent matching engine. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a server (e.g., the server 504) obtains a natural language query from a first user device (e.g., the querying user device 502). For example, a user of the first user device may speak or type the query to a chat bot during a communication session with the chat bot. The first user device may access the chat bot by connecting to the server using at least one of: a PSTN connection, a chat application, a dedicated application associated with the server, or a website associated with the server. The PSTN connection may correspond to a toll-free number of a business associated with the server (e.g., a toll free number of ABC Corporation). The chat application may include an account for the business (e.g., an account of ABC Corporation in a social media or messaging service). The dedicated application may be a mobile or tablet computer application of the business (e.g., a mobile application of ABC Corporation). The website may be a website of the business (e.g., a website of ABC Corporation).

At 904, the server matches an intent to the natural language query using an intent matching engine (e.g., the intent matching engine 510). The intent represents a predicted user goal associated with the natural language query. The server may store a set of intents, and may attempt to match the natural language query to one of the intents, or to determine that the natural language query does not match to any of the stored intents. If the natural language query does not match to any of the intents, other search techniques (e.g., text-based search) may be applied, an error message may be presented, or the natural language query may be forwarded to a human agent for manual processing. The intent matching engine may be an artificial neural network that is trained to match queries to intents based on text or utterances in the query. Alternatively, other artificial intelligence or rule-based technology may be used to implement the intent matching engine.

In some cases, the server stores a first set of global intents, that are applicable to multiple different businesses or organizations, and a second set of custom intents that are applicable to the business or organization operating the server. For example, the intent "change billing address" may be associated with multiple different businesses, for example, banks, insurance companies, online stores, and airlines. However, the intent "change seat" may be relevant to an airline but not relevant to a bank, an insurance company, or an online store. Thus, the set of intents for an airline may include global intents, such as, "change billing address," and "reset password," and some airline-specific intents, such as "change seat," and "report lost luggage."

The server may access a data repository that maps intents to workflows. In some implementations, the server transmits, to the first user device in response to the natural language query, a workflow output associated with a workflow to which the intent is mapped. The workflow output may include at least one of: a hyperlink, a webpage, an article, a list of actions, a chatbot-operated interface, or initiating a communication session between a human agent assigned to handle the workflow and a user of the first user device. In some cases, an intent may map to a single workflow, and the output associated with the single workflow may be provided whenever the intent is encountered.

In some cases, an intent may map to multiple workflows. If the intent maps to multiple workflows, artificial intelligence (or other) techniques may be used to select a workflow for the user. For example, if the intent is "file a claim" for a car insurance business, and the user associated with the intent has previously used the website to manage their insurance policy, an article explaining how to file a claim may be provided to the user. Alternatively, if the user is a person who rarely accesses the website (or does not have a user account associated with the website), a human agent (e.g., operating the agent device 404) may be connected with the user. In some examples, if the user is known to be fluent in German and to have difficulty communicating in English, a German version of the article and/or a German-speaking human agent may be used.

The server may monitor activity of the first user device with respect to the transmitted workflow output. The intent matching engine may be further trained based on activity of the first user device with respect to the transmitted workflow output. For example, if the first user device is provided with the hyperlink to the article about how to file a claim on the insurance company website, but the first user device never selects the article and the first user device is not used to file the claim, the server may determine that the intent "file claim" was improperly matched to the natural language query submitted by the first user device. Alternatively, if the first user device accesses the article and uses the website to file the claim, the server may determine that the intent "file claim" was properly matched to the natural language query submitted by the first user device.

At 906, the server transmits the natural language query and the intent to a second user device (e.g., the reviewing user device 506). In some examples, a page (e.g., the page 804) associated with a given intent (e.g., the intent "process refund") may include representations of multiple queries (e.g., the queries 808A, 808B) that were matched to the intent. The page may be presented in a web browser or in a dedicated application associated with the server.

At 908, the server receives, from the second user device, a response indicating whether the natural language query is properly matched to the intent. The response may include a user selection of a first user interface icon (e.g., the "yes" buttons 810A, 810B) indicating that the matching (of the query to the intent) is accurate or a user selection of a second user interface icon (e.g., the "no" buttons 812A, 812B) indicating that the matching is inaccurate.

At 910, the server trains the intent matching engine based on online learning and the response. In some cases, the server stores training data (e.g., the training data 614), and the response from the second user device is added to the training data. The training data may be used to train the intent matching engine. The training operation may be run in real time when a new response is added to the training data. Alternatively, to reduce the resources used for training, the training operation may be run once every threshold time period (e.g., once per week or once per month) with all the training data received during the time period. In some examples, the training operation may be run whenever a certain number (e.g., 1000, 10,000, 100,000, or 1,000,000) responses are added to the training data. The number may be adjusted based on the number of previously used training data responses. For example, when there are few training data responses, the training operation may be rerun whenever 100 or 1000 new training responses are received. As the intent matching engine is trained on more and more data, and new training data units do not have much impact on its operation, then number may be increased to 100,000 or 1,000,000.

In some cases, the server processes multiple natural language queries. The server may monitor a number of queries associated with each intent during multiple time periods. The server may generate (and transmit to an agent device or the second user device) a dashboard displaying the number of queries associated with a given intent during all or a subset of the multiple time periods. For example, an insurance company may have the intents "renew policy" and "file claim" and may track the number of times these intents are found in each month. This dashboard can be used to generate an early indicator that the number of users filing claims is increasing and/or that the number of users renewing their policies is decreasing. Such an early indicator may be useful, for example, in understanding the finances of the insurance company.

In one example use case, Anna telephones a taxi service and says, "Quiero ir al aeropuerto," which can be translated to "I want to go to the airport," in Spanish. A chat bot at a server of the taxi service obtains the query "Quiero ir al aeropuerto," and matches this query to the intent "request taxi." The server may store English language intents and may have been trained to match both Spanish language queries and English language queries to the English language intents. Alternatively, the server may automatically detect the language of the query and automatically translate the query into English prior to matching the query to the intent.

The server attempts to map a workflow to the intent "request taxi." Several workflows are stored in a database coupled with the server. The workflows include: an article explaining how to use a mobile application to call a taxi, a text-operated chat bot website interface to call a taxi, an English language audio-operated chat bot interface to call a taxi, and an English and Spanish-speaking human operator who can assist with calling the taxi. Since Anna is accessing the taxi service over the PSTN, the server determines that either the audio-operated chat bot interface or the human operator would be most appropriate. Furthermore, as Anna spoke her query in Spanish, and the human operator speaks Spanish (while the chat bot does not have a Spanish interface), the server determines that the English and Spanish-speaking human operator is an optimal workflow for Anna (from the available workflows). Anna is then connected with the human operator, who assists Anna with ordering the taxi.

With appropriate notification to Anna, Anna's telephone call, including the query, could be recorded. The recording of the query spoken by Anna, as well as an indication of the intent to which it was matched, could be transmitted to a human agent for review. The human agent may confirm that the query "Quiero it al aeropuerto," was correctly matched to the intent "request taxi," thereby generating training data for the intent matching engine of the server of the taxi service. The training data may be used to train the intent matching engine.

At a later time, an agent of the taxi service may access a dashboard review the intents that were submitted in each month of the last several months. The dashboard may include the intents "request taxi," "dispute charge," and "lost item." When selecting the "request taxi" intent on the dashboard, the number of queries matching to the intent may be indicated, as well as the source (e.g., telephone or website) and the language of the queries may be indicated. As a result, an agent accessing the dashboard may be able to determine that the number of Spanish language telephone requests for taxis is increasing. This may encourage the agent to recommend hiring additional Spanish-speaking telephone contact center agents and/or creating a Spanish-language voice-operated chat bot for processing taxi requests.

Some implementations are described below as numbered examples (Example 1, 2, 3, etc.). These examples are provided as examples only and do not limit the other implementations disclosed herein.

Example 1 is a method, comprising: obtaining a natural language query from a first user device; matching an intent to the natural language query using an intent matching engine, wherein the intent represents predicted data associated with the natural language query; transmitting the natural language query and the intent to a second user device; receiving, from the second user device, a response indicating whether the natural language query is properly matched to the intent; and training the intent matching engine based on a machine learning technique and the response.

In Example 2, the subject matter of Example 1 includes, transmitting, to the first user device, a workflow output associated with a workflow to which the intent is mapped, wherein the workflow output comprises at least one of: a hyperlink, a webpage, an article, a list of actions, a chatbot-operated interface, or an initiation of a communication session between a human agent assigned to handle the workflow and a user of the first user device; monitoring activity of the first user device with respect to the workflow output, wherein the intent matching engine is further trained based on the activity of the first user device with respect to the workflow output.

In Example 3, the subject matter of Examples 1-2 includes, wherein the natural language query is one of a plurality of queries, wherein each query of the plurality of queries is matched to an intent from a set of intents, the method comprising: monitoring a number of queries from the plurality of queries that are associated with each intent during multiple time periods; and transmitting, to the second user device, a dashboard display indicating the number of queries associated with a given intent during a subset of the multiple time periods.

In Example 4, the subject matter of Examples 1-3 includes, wherein the response comprises a selection of either a first option indicating that the matching is accurate or a second option indicating that the matching is inaccurate.

In Example 5, the subject matter of Examples 1-4 includes, wherein the intent is selected from a set comprising global intents for multiple entities and custom intents for an entity associated with the second user device.

In Example 6, the subject matter of Examples 1-5 includes, wherein receiving from the second user device the response indicating whether matching the intent to the natural language query is accurate comprises: transmitting a page associated with the intent to second user device, wherein the page displays multiple queries, including the natural language query that matched to the intent; and receiving the response from the second user device via the page.

In Example 7, the subject matter of Examples 1-6 includes, determining that the natural language query is in a natural language different from a natural language associated with the intent; and translating the natural language query into the natural language associated with the intent prior to matching the intent to the natural language query.

In Example 8, the subject matter of Examples 1-7 includes, determining that the natural language query is in a natural language different from a natural language associated with the intent, wherein the intent is matched to the natural language query without translating the natural language query.

In Example 9, the subject matter of Examples 1-8 includes, wherein the machine learning technique comprises online learning.

Example 10 is a computer readable medium storing instructions operable to cause one or more processors to perform operations comprising: obtaining a natural language query from a first user device; matching an intent to the natural language query using an intent matching engine, wherein the intent represents predicted data associated with the natural language query; transmitting the natural language query and the intent to a second user device; receiving, from the second user device, a response indicating whether the natural language query is properly matched to the intent; and training the intent matching engine based on a machine learning technique and the response.

In Example 11, the subject matter of Example 10 includes, the operations comprising: transmitting, to the first user device, an audio or visual output associated with a workflow to which the intent is mapped, wherein the audio or visual output comprises at least one of: an article, a list of actions, a chatbot-operated interface, or an initiation of a communication session between a human agent assigned to handle the workflow and a user of the first user device; monitoring activity of the first user device with respect to the audio or visual output, wherein the intent matching engine is further trained based on the activity of the first user device with respect to the audio or visual output.

In Example 12, the subject matter of Examples 10-11 includes, wherein the natural language query is one of a plurality of queries, wherein each query of the plurality of queries is matched to an intent from a set of intents, the operations comprising: monitoring a number of queries from the plurality of queries that are associated with each intent during a set of discrete time periods; and transmitting, to the second user device, a dashboard display indicating the number of queries associated with a given intent during a subset of the discrete time periods.

In Example 13, the subject matter of Examples 9-12 includes, wherein the response comprises a selection of either a first graphical user interface icon indicating that the matching is accurate or a second graphical user interface icon indicating that the matching is inaccurate.

In Example 14, the subject matter of Examples 10-13 includes, wherein receiving from the second user device the response indicating whether matching the intent to the natural language query is accurate comprises: transmitting a graphical user interface associated with the intent to second user device, wherein the graphical user interface displays multiple queries, including the natural language query that matched to the intent; and receiving the response from the second user device via the graphical user interface.

In Example 15, the subject matter of Examples 10-14 includes, the operations comprising: determining that the natural language query is in a first natural language, wherein the intent is associated with a second natural language different from the first natural language; and translating the natural language query into the second natural language prior to matching the intent to the natural language query.

In Example 16, the subject matter of Examples 10-15 includes, the operations comprising: determining that the natural language query is in a first natural language, wherein the intent is associated with a second natural language different from the first natural language, wherein the intent is matched to the natural language query without translating the natural language query into the second natural language.

Example 17 is an apparatus, comprising: a memory; and a processor configured to execute instructions stored in the memory to: obtain a natural language query from a first user device; match an intent to the natural language query using an intent matching engine, wherein the intent represents predicted data associated with the natural language query; transmit the natural language query and the intent to a second user device; receive, from the second user device, a response indicating whether the natural language query is properly matched to the intent; and train the intent matching engine based on a machine learning technique and the response.

In Example 18, the subject matter of Example 17 includes, the processor configured to execute the instructions stored in the memory to: map the intent to a workflow; transmit, to the first user device, an audio or visual output associated with the workflow, wherein the audio or visual output comprises at least one of: an article, a list of actions, a chatbot-operated interface, or an initiation of a communication session between a human agent assigned to handle the workflow and a user of the first user device; monitor activity of the first user device with respect to the transmitted audio or visual output, wherein the intent matching engine is further trained based on the activity of the first user device with respect to the transmitted audio or visual output.

In Example 19, the subject matter of Examples 17-18 includes, wherein the natural language query is one of a plurality of queries, wherein each query of the plurality of queries is matched to an intent from a set of intents, the operations comprising: monitoring a number of queries from the plurality of queries that are associated with each intent over time; and transmitting, to the second user device, a graphical dashboard display indicating the number of queries associated with a given intent over time.

In Example 20, the subject matter of Examples 17-19 includes, wherein the response comprises a selection of either a first user interface element indicating that the matching is accurate or a second user interface element indicating that the matching is inaccurate.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   obtaining, by a server, a natural language query from a first user device within a chatbot;
   storing a set of intents that are matched to natural language queries based on previous natural language queries and network activities of user devices in response to previous workflow outputs;
   matching an intent to the natural language query using an intent matching engine, wherein the intent represents predicted data associated with the natural language query, wherein each intent is mapped to a workflow in a data repository accessed by the server, and wherein the set of intents includes a set of global intents that are globally applicable and a set of custom intents that are only applicable to the server;
   transmitting the natural language query and the intent to a second user device in response to matching the intent to the natural language query;
   receiving, from the second user device, a response indicating whether the natural language query is properly matched to the intent;
   transmitting, to the first user device within the chatbot, a workflow output associated with the workflow to which the intent is mapped;
   monitoring network activity within the chatbot of the first user device with respect to the workflow output; and
   training, using online learning applied to a convolutional neural network of the intent matching engine, the intent matching engine based on the monitored network activity of the first user device and the response.

2. The method of claim 1,
   wherein the workflow output comprises at least one of: a hyperlink, a webpage, an article, or a list of actions.

3. The method of claim 1, wherein the natural language query is one of a plurality of queries, wherein each query of the plurality of queries is matched to an intent from a set of intents, the method comprising:
   monitoring a number of queries from the plurality of queries that are associated with each intent during multiple time periods; and
   transmitting, to the second user device, a dashboard display indicating the number of queries associated with a given intent during a subset of the multiple time periods.

4. The method of claim 1, wherein the response comprises a selection of either a first option indicating that the matching is accurate or a second option indicating that the matching is inaccurate.

5. The method of claim 1, wherein receiving from the second user device the response indicating whether matching the intent to the natural language query is accurate comprises:
   transmitting a page associated with the intent to second user device, wherein the page displays multiple queries, including the natural language query that matched to the intent; and
   receiving the response from the second user device via the page.

6. The method of claim 1, comprising:
   determining that the natural language query is in a natural language different from a natural language associated with the intent; and
   translating the natural language query into the natural language associated with the intent prior to matching the intent to the natural language query.

7. The method of claim 1, comprising:
   determining that the natural language query is in a natural language different from a natural language associated with the intent, wherein the intent is matched to the natural language query without translating the natural language query.

8. One or more non-transitory computer readable media storing instructions operable to cause one or more processors to perform operations comprising:
   obtaining, by a server, a natural language query from a first user device within a chatbot;
   storing a set of intents that are matched to natural language queries based on previous natural language queries and network activities of user devices in response to previous workflow outputs;
   matching an intent to the natural language query using an intent matching engine, wherein the intent represents predicted data associated with the natural language query, wherein each intent is mapped to a workflow in a data repository accessed by the server, and wherein the set of intents includes a set of global intents that are globally applicable a set of custom intents that are only applicable to the server;
   transmitting the natural language query and the intent to a second user device in response to matching the intent to the natural language query;
   receiving, from the second user device, a response indicating whether the natural language query is properly matched to the intent;
   transmitting, to the first user device within the chatbot, a workflow output associated with the workflow to which the intent is mapped;
   monitoring network activity within the chatbot of the first user device with respect to the workflow output; and
   training, using online learning applied to a convolutional neural network of the intent matching engine, the intent matching engine based on the monitored network activity of the first user device and the response.

9. The one or more computer readable media of claim 8, wherein the workflow output comprises at least one of: a hyperlink, a webpage, an article, or a list of actions.

10. The one or more computer readable media of claim 8, wherein the natural language query is one of a plurality of queries, wherein each query of the plurality of queries is matched to an intent from a set of intents, the operations comprising:

monitoring a number of queries from the plurality of queries that are associated with each intent during a set of discrete time periods; and transmitting, to the second user device, a dashboard display indicating the number of queries associated with a given intent during a subset of the discrete time periods.

11. The one or more computer readable media of claim 8, wherein the response comprises a selection of either a first graphical user interface icon indicating that the matching is accurate or a second graphical user interface icon indicating that the matching is inaccurate.

12. The one or more computer readable media of claim 8, wherein receiving from the second user device the response indicating whether matching the intent to the natural language query is accurate comprises:

transmitting a graphical user interface associated with the intent to second user device, wherein the graphical user interface displays multiple queries, including the natural language query that matched to the intent; and receiving the response from the second user device via the graphical user interface.

13. The one or more computer readable media of claim 8, the operations comprising:

determining that the natural language query is in a first natural language, wherein the intent is associated with a second natural language different from the first natural language; and translating the natural language query into the second natural language prior to matching the intent to the natural language query.

14. The one or more computer readable media of claim 8, the operations comprising:

determining that the natural language query is in a first natural language, wherein the intent is associated with a second natural language different from the first natural language, wherein the intent is matched to the natural language query without translating the natural language query into the second natural language.

15. A system, comprising:
one or more memories; and
one or more processors configured to execute instructions stored in the one or more memories to:

obtain, by a server, a natural language query from a first user device within a chatbot;

store a set of intents that are matched to natural language queries based on previous natural language queries and network activities of user devices in response to previous workflow outputs;

match an intent to the natural language query using an intent matching engine, wherein the intent represents predicted data associated with the natural language query, wherein each intent is mapped to a workflow in a data repository accessed by the server, and wherein the set of intents includes a set of global intents that are globally applicable and a set of custom intents that are only applicable to the server;

transmit the natural language query and the intent to a second user device in response to matching the intent to the natural language query;

receive, from the second user device, a response indicating whether the natural language query is properly matched to the intent;

transmit, to the first user device within the chatbot, a workflow output associated with the workflow to which the intent is mapped;

monitor network activity within the chatbot of the first user device with respect to the workflow output; and train, using online learning applied to a convolutional neural network of the intent matching engine, the intent matching engine based on the monitored network activity of the first user device and the response.

16. The system of claim 15, wherein the workflow output comprises at least one of: a hyperlink, a webpage, an article, or a list of actions.

17. The system of claim 15, wherein the natural language query is one of a plurality of queries, wherein each query of the plurality of queries is matched to an intent from a set of intents, the one or more processors configured to execute the instructions stored in the one or more memories to:

monitor a number of queries from the plurality of queries that are associated with each intent over time; and transmit, to the second user device, a graphical dashboard display indicating the number of queries associated with a given intent over time.

18. The system of claim 15, wherein the response comprises a selection of either a first user interface element indicating that the matching is accurate or a second user interface element indicating that the matching is inaccurate.

* * * * *